UNITED STATES PATENT OFFICE 2,604,466

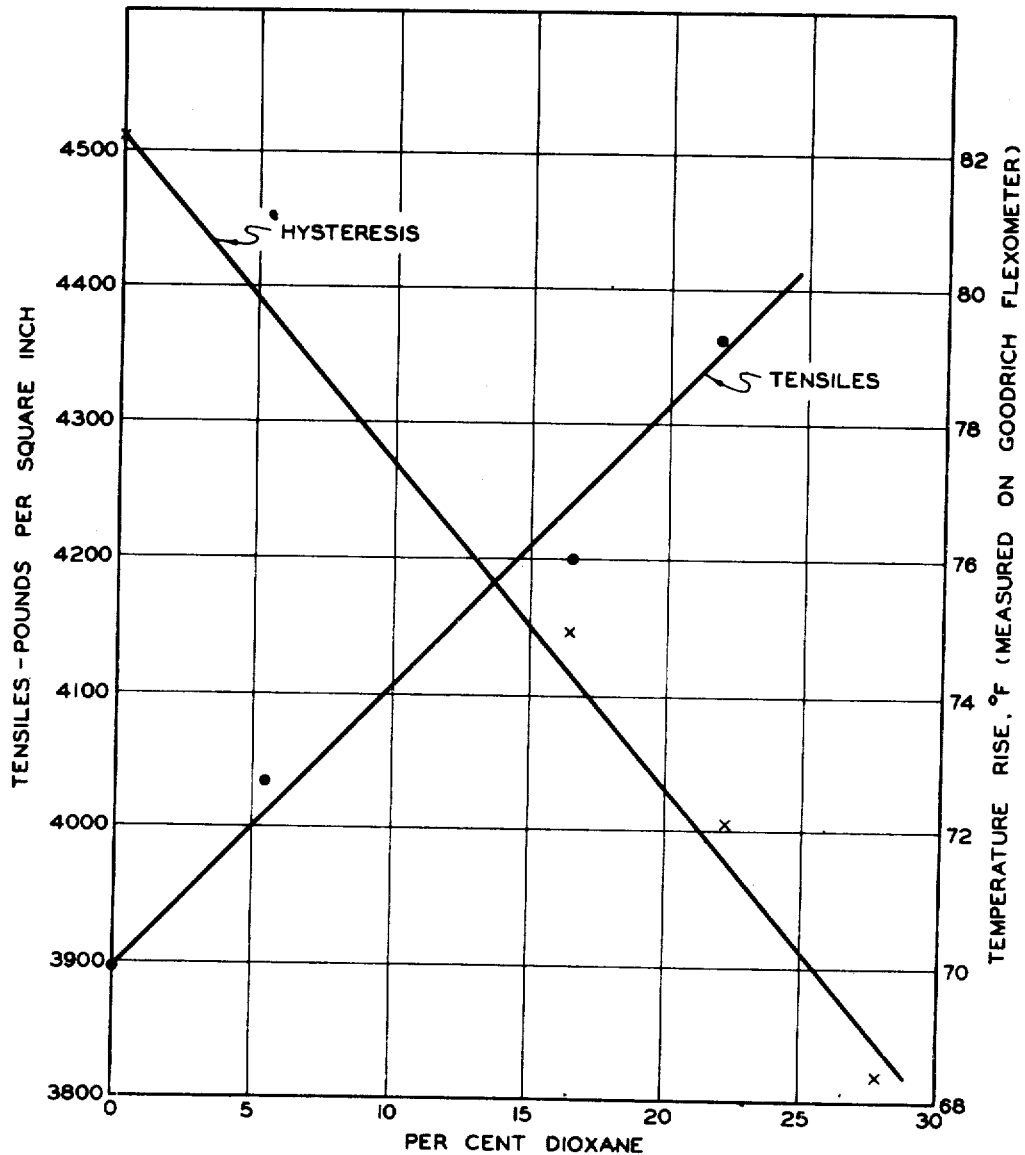

EMULSION POLYMERIZATION IN THE PRESENCE OF A DIOXANE

Charles F. Fryling and James E. Troyan, Phillips, Tex., and James E. Pritchard, La Fayette, Ind., assignors to Phillips Petroleum Company, a corporation of Delaware Application July 8, 1947, Serial No. 759,512

3 Claims. (Cl. 260—84.1)

This invention relates to the polymerization of unsaturated organic compounds capable of undergoing an addition polymerization to form high molecular weight polymers. In one of its more specific aspects it relates to the polymerization of an aliphatic conjugated diene hydrocarbon, including substituted derivatives, either alone or in admixture with a monomer copolymerizable therewith, to form long chain polymers of the type known as synthetic rubbers. In a still more specific aspect it relates to the polymerization of a butadiene-1,3 hydrocarbon and a monomer copolymerizable therewith in an aqueous dispersion.

In the production of synthetic elastomers having rubber-like properties a conjugated diolefin such as butadiene, isoprene, chloroprene, and the like is polymerized, either alone or with a monomer copolymerizable therewith such as styrene, alpha-methyl styrene, acrylonitrile, methacrylonitrile, methyl methacrylate, or other compounds containing a vinyl group. In the widely used emulsion polymerization process the monomers are dispersed in water containing an emulsifying agent, and a modifier and the polymerization catalyst added. The emulsion is maintained at a suitable temperature and agitated by stirring, or other agitation, until the desired degree of conversion has been attained, after which the reaction is shortstopped, the latex treated with an antioxidant and coagulated, and the polymer collected and dried. Numerous recipes have been developed in which a variety of modifiers, activators, catalysts, and the like, are employed to provide desirable properties in the polymers. These recipes have also introduced variations in operating conditions such as may apply to reaction temperatures, rates of agitation, ratio of components, etc., in order to influence further the quality and properties of the product.

These variations in the nature and amounts of the ingredients dispersed in the aqueous emulsion, together with those applied to the operating conditions, have provided numerous advantages and have generally contributed desirable properties in the polymers produced. However, when operating in this manner, certain limitations are encountered. One of these lies in the difficulties encountered in the production of readily processible high molecular weight polymers. Heretofore the usual procedure employed for the production of such polymers consists in reducing the amount of modifier incorporated in the polymerization recipe. However, attempts to extend this effect beyond relatively narrow limits result in cross linking between the polymer units which leads to the formation of gel-type products which are undesirable for use in the production of most types of synthetic rubber.

We have now discovered a process for the emulsion polymerization of polymerizable organic compounds wherein high molecular weight polymers may be produced which are substantially gel-free and are characterized by easy processibility. The method of our invention involves the use of novel emulsion systems in which the dispersing medium comprises an aqueous solution of dioxane. When operating in this manner the polymers obtained show high intrinsic viscosity and Mooney values, are substantially 100 per cent benzene soluble, and are easily worked on the mill. Furthermore, when these products are compounded and cured, their physical evaluation shows superiority with respect to tensile strength, hysteresis, resilience, and the like.

The monomeric material polymerized to produce polymers by the process of this invention comprises unsaturated organic compounds which generally contain the characteristic structure $CH_2=C<$ and, in most cases, have at least one of the disconnected valencies attached to an electronegative group, that is, a group which increases the polar character of the molecule such as a chlorine group or an organic group containing a double or triple bond such as vinyl, phenyl, cyano, carboxy or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene, (2-chloro-1,3-butadiene) bromoprene, methylchloroprene (2-chloro-3-methyl-1,3-butadiene), and the like; aryl olefins such as styrene, various alkyl styrenes, p-chlorostyrene, p-methoxystyrene, alpha-methylstyrene, vinylnapthalene and similar derivatives thereof, and the like; acrylic and substituted acrylic acids and their esters, nitriles and amides such as acrylic acid, methacrylic acid methyl acrylate, ethyl acrylate, methyl alpha-chloroacrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinylfurane, vinylcarbasole, vinylacetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride and similar compounds mentioned hereinabove. In this case the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants.

One object of this invention is to polymerize unsaturated organic compounds.

Another object of this invention is to produce an improved synthetic rubber.

A further object of this invention is to produce a synthetic rubber by polymerization of monomeric material in aqueous emulsion at temperatures lower than ordinarily used.

Another object of this invention is to produce a readily processable synthetic rubber polymer having a high tensile strength.

Still another object of this invention is to produce a readily processable synthetic rubber polymer having a low hysteresis.

Other objects and advantages of this invention will become apparent, to one skilled in the art, from the accompanying disclosure and discussion.

The aqueous medium employed in the present process comprises aqueous solutions of dioxane. The concentration of a dioxane solution will vary with the particular polymerization recipe employed but will usually be in a range between about 10 and about 65 per cent, and preferably between about 20 and about 50 per cent. When operating according to the method of this invention temperatures may range from about —30 to about 70° C. with temperatures from about —10 to about 50° C. usually preferred. It is generally preferred that the emulsion be of an "oil in water" type, with the ratio of aqueous medium to monomeric material between about 0.5:1 and about 5:1, preferably about 1.5:1 and about 2.75:1, in parts by weight. At low ratios the emulsions tend to have high viscosities and at high ratios the yield per unit volume of reactor per unit of time is low. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase.

The novel emulsion systems of our invention are prepared by introducing the desired amount of dioxane solution into the reactor and adding thereto the emulsifying agent, the monomers, modifier, and catalyst. The system is suitably agitated during the addition of the ingredients and throughout the reaction period. It is generally preferred to use 1,4-dioxane or 1,3-dioxane in the practice of our invention, but at times it may be found to be desirable to use a methyl or an ethyl derivative of one of these dioxanes. These compounds can be characterized by the formula

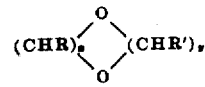

where $x$ is 1 or 2 and $y$ is 2 or 3 and $x+y=4$, and where each R and R' is of the group consisting of hydrogen, methyl, and ethyl and not more than one R and not more than one R' is such an alkyl.

The present process is adaptable for use with those polymerization recipes in which the reaction has heretofore been effected in aqueous emulsion. Typical of these are the potassium persulfate, redox, and ferricyanide-diazo thioether-mercaptan recipes. As is known to those skilled in the art, polymerization in aqueous emulsion is initiated and/or promoted by oxidizing agents, such as peroxides and peracids, including hydrogen peroxide and various organic peroxides, persulfates, perborates, and the like, any one of which has its own individual characteristics. The redox systems are so named because the redox compositions comprise an oxidant and a reductant. The oxidant may be one of those previously listed, and the reducing agent is preferably an organic polyhydroxy compound, such as a sugar. Preferably the reducing agent is used in admixture with or in combination with a heavy metal salt, such as metal being capable of existing in more than one valence state, such as iron, cobalt, nickel, or copper, or a metal such as zinc or cadmium. The ferricyanide-diazo thioether-mercaptan recipes employ, as reaction activator, a composition comprising a ferricyanide of an alkali metal or of ammonium, any one of a host of diazo thioethers, and a mercaptan as reaction initiators and/or catalysts. The amount of ferricyanide will generally be in the range of about 0.03 to about 1 part per 100 parts of monomeric material. The diazo thioether will have the general formula R—N=N—S—R' where R is aromatic or substituted aromatic and R' is aromatic, substituted aromatic, alkyl, cycloalkyl, and the like. In general the diazo thioether may be either water-soluble or oil-soluble, and will be used in an amount between about 0.05 and about 2 parts per 100 parts of monomeric material. The mercaptan may be either primary, secondary, or tertiary, or be a mixture thereof, and have from four to twenty carbon atoms per molecule. It will be used in an amount between about 0.05 and about 1.4 parts per 100 parts of monomeric material. The optimum amount of each component in any individual case will, of course, be dependent upon the characteristics of the particular mixture employed, and can be readily determined by simple trial by one skilled in the art. As has been mentioned above, the concentration of dioxane solution employed will vary somewhat with different recipes. For example when employing the well known GR-S formulation, in which potassium persulfate is used as an initiator, the concentration of dioxane in the dispensing medium will preferably be between about 20 and 25 per cent, since higher values tend to retard the rate of reaction, while with certain ferricyanide-activated recipes optimum results are obtained with higher concentrations, usually between about 35 and 40 per cent.

The polymers obtained from our process have intrinsic viscosity values between about 2.5 and 4.0 and Mooney values in the range from about 60 to 110, although values outside these limits may be obtained in some instances. They are substantially gel-free, as shown by their solubility in benzene. While these products can usually be milled with ease, we have found that when desired they may be heat softened, say to a 50 Mooney value, and milled without deterioration in physical properties of the vulcanizate.

When the polymers produced by our process are compounded and cured their properties show marked superiority over those obtained from the same recipes when the reactions are carried out in aqueous emulsion. For example, polymers were prepared according to the following typical recipe.

TYPICAL POLYMERIZATION RECIPE

| | Parts by weight |
|---|---|
| Butadiene | 72 |
| Styrene | 28 |
| Soap | 5 |
| Aqueous medium | 180 |
| Potassium persulfate | 0.3 |
| Dodecyl mercaptan | 0.5 |

Temperature, 50° C.

While using a 22 per cent aqueous solution of dioxane as the aqueous dispersing medium the resulting polymers, after compounding, has a tensile strength from 20 to 30 per cent higher than the tensile strength of samples prepared in standard aqueous emulsion, the samples being cured to an optimum degree after compounding according to the following recipe:

| | Parts by weight |
|---|---|
| Polymer | 100 |
| Carbon black [1] | 50 |
| Zinc oxide | 3 |
| Asphalt #6 (an asphalt softener) | 6 |
| Sulfur | 1.75 |
| Santocure (N-cyclohexyl-2-benzothiazole-sulfenamide) | 0.6 to 0.8 |
| Stearic acid (total) | 3 |

[1] A hard, highly reinforcing furnace black.

A comparison of the polymers made with aqueous media containing various water-dioxane ratios reveals that as the percentage of dioxane is increased the tensile strength increases and hysteresis is diminished, while flex life is unaffected. These properties are shown in the accompanying drawing, in which are represented tensile strength and hysteresis values for polymers prepared by the foregoing polymerization recipe using dioxane solutions of increasing concentrations as the dispersing media. Compounding of the polymers for evaluation was effected by use of the following recipe:

| | Parts by weight |
|---|---|
| Polymer | 100 |
| EPC channel black | 50 |
| Zinc oxide | 3 |
| Asphalt #6 (an asphalt softener) | 6 |
| Sulfur | 1.75 |
| Santocure (N-cyclohexyl-2-benzothiazole-sulfenamide) | 1.20 |
| Stearic acid | 1.50 |

Tests for resilience reveal a similar degree of superiority over the products of previous methods.

A further application of the emulsion systems of our invention lies in their use in extremely low temperature polymerizations. It has been observed that lowering in the temperature of the reaction results in improved properties in the polymers produced and recipes have been developed for such operations. Obviously the limit of temperature lowering with aqueous emulsions is at the freezing point of water. By the use of our dioxane solution dispersing media, lower operating temperatures are made available for this type of recipe.

Advantages of this invention are illustrated by the following examples. The reactants, and their proportions, and the other specific ingredients of the recipes are presented as being typical and should not be construed to limit the invention unduly.

EXAMPLE I

Three polymerization bottles were charged with 180 parts of a 55 per cent dioxane solution as a dispersing medium and the ingredients of the following recipe:

| | Parts by weight |
|---|---|
| Butadiene | 72 |
| Styrene | 28 |
| Soap | 5 |
| Potassium persulfate | 0.3 |
| Primary $C_{12}$ mercaptan (modifier) | 0.3, 0.4, 0.5 |

The bottles were agitated at 50° C. until a conversion of approximately 80 per cent had been reached at which point the reactions were shortstopped in the conventional manner. The contents were stabilized and coagulated and the polymer separated and dried. Tests on the products are shown below.

| Mercaptan Modifier (Parts) | Intrinsic Viscosity | Mooney Values (ML4) | Gel Content |
|---|---|---|---|
| 0.3 | 3.22 | 110 | 0 |
| 0.4 | 3.33 | 105 | 0 |
| 0.5 | 2.88 | 89 | 0 |

It will be noted that at 80 per cent conversion gel-free polymers of high intrinsic viscosities and Mooney values are obtained with low modifier concentration and that with normal modifier content the values remain at elevated levels. These high-Mooney rubbers were characterized by rapid breakdown on the mill and consequent easy processibility.

EXAMPLE II

Two polymerization bottles were charged with the recipe of Example I using in one 180 parts of a 22 per cent solution of dioxane as the dispersing medium and in the other 180 parts of water. The concentration of modified (primary $C_{12}$ mercaptan) employed was 0.3 part. The bottles were agitated at 50° C. until a conversion of 75±3 per cent had been attained. After removal and drying the polymer was compounded for testing according to the following recipe:

| | Parts by weight |
|---|---|
| Polymer | 100 |
| EPC channel black | 50 |
| Zinc oxide | 5 |
| BRT #7 (a petroleum-type softener) | 0.35 |
| Sulfur | 2 |
| Captax (mercaptobenzothioazole) | 1.5 |

Results of the tests are shown below.

| Polymer | Intrinsic Viscosity | Gel Content | Minutes Cure | Tensile (p. s. i.) | Elongation, Per Cent |
|---|---|---|---|---|---|
| Control | 2.61 | 0 | 50 | 3,450 | 675 |
|  |  |  | 90 | 3,450 | 570 |
| Dioxane process | 3.23 | 0 | 50 | 3,690 | 680 |
|  |  |  | 90 | 3,850 | 610 |

EXAMPLE III

The run of Example II was repeated to provide larger quantities of polymer for more extended evaluation. The polymerization was continued to an average conversion of 75 per cent. Polymers were also prepared using the same recipe but with water substituted for the dioxane solution dispersing medium, the said polymers being for use as controls in the evaluation. The compounding recipe employed for evaluation of the samples was as follows:

|  | Parts by weight |
|---|---|
| Polymer | 100 |
| Carbon black [1] | 50 |
| Zinc oxide | 3 |
| Asphalt No. 6 (an asphalt softener) | 6 |
| Sulfur | 1.75 |
| Santocure (N-cyclohexyl-2-benzothiazole-sulfenamide) | 0.8 |
| Stearic acid (total) | 3 |

[1] A hard, highly reinforcing furnace black.

Evaluation data are tabulated in Tables I, II, III, and IV.

TABLE I

Stress-strain properties at 80° F.

| Min. Cure at 307° F. | Pounds per Square Inch at— | | | | | | Elongation (per cent) |
|---|---|---|---|---|---|---|---|
|  | 100% | 200% | 300% | 400% | 500% | Break |  |
| (DIOXANE PROCESS POLYMERS) | | | | | | | |
| 10 | 125 | 240 | 470 | 800 | 1,320 | 2,650 | 780 |
| 20 | 210 | 540 | 1,230 | 1,900 | 2,800 | 4,430 | 650 |
| 30 | 200 | 540 | 1,275 | 2,020 | 2,995 | 4,360 | 613 |
| 45 | 200 | 610 | 1,475 | 2,340 | 3,400 | 4,180 | 580 |
| (CONTROL) | | | | | | | |
| 10 | 0 | 70 | 110 | 170 | 230 | 460 | 950 |
| 20 | 180 | 320 | 610 | 1,050 | 1,530 | 3,210 | 780 |
| 30 | 150 | 395 | 850 | 1,480 | 2,000 | 3,310 | 645 |
| 45 | 180 | 460 | 1,130 | 1,700 | 2,370 | 3,675 | 643 |

TABLE II

Stress-strain properties at 200° F.

| Min. Cure at 307° F. | Pounds per Square Inch at— | | | | Elongation (per cent) |
|---|---|---|---|---|---|
|  | 100% | 200% | 300% | Break |  |
| (DIOXANE PROCESS POLYMERS) | | | | | |
| 20 | 60 | 190 | 500 | 1,380 | 500 |
| 45 | 80 | 280 | 600 | 1,200 | 400 |
| (CONTROL) | | | | | |
| 20 | 0 | 80 | 320 | 1,180 | 593 |
| 45 | 60 | 220 | 560 | 940 | 405 |

TABLE III

Stress-strain properties oven aged 24 hours at 212° F.

| Min. Cure at 307° F. | Pounds per Square Inch at— | | | | Elongation (per cent) |
|---|---|---|---|---|---|
|  | 100% | 200% | 300% | Break |  |
| (DIOXANE PROCESS POLYMERS) | | | | | |
| 10 | 300 | 930 | 1,850 | 3,370 | 440 |
| 30 | 300 | 1,180 | 2,140 | 3,195 | 390 |
| (CONTROL) | | | | | |
| 10 | 120 | 270 | 600 | 3,020 | 795 |
| 30 | 300 | 940 | 1,760 | 2,660 | 403 |

TABLE IV

Hysteresis properties

| Min. Cure at 307° F. | *ΔT' ° F. | Dynamic Compression | | Permanent Set (Per Cent) | Resilience (Per Cent) | Compressed (Per Cent) |
|---|---|---|---|---|---|---|
|  |  | Initial | Increase |  |  |  |
| (DIOXANE PROCESS POLYMERS) | | | | | | |
| 30 | 73.1 | 12.9 | 1.4 | 0.8 | 64.9 | 36.4 |
| 45 | 72.7 | 12.6 | 0.0 | 0.4 | 65.3 | 34.5 |
| (CONTROL) | | | | | | |
| 30 | 85.7 | 14.8 | 7.8 | 3.2 | 58.1 | 40.7 |
| 45 | 82.3 | 15.6 | 3.2 | 1.2 | 60.1 | 38.8 |

*Temperature rise as measured on Goodrich Flexometer.

EXAMPLE IV

Polymers were prepared using the following recipe:

|  | Parts by weight |
|---|---|
| Butadiene | 72. |
| Styrene | 28. |
| Soap | 4. |
| Potassium ferricyanide | 0.3 |
| Sodium sulfate | 0.2 |
| Diazo thioether [1] | 0.1 |
| tert-$C_{12}$ mercaptan | 0.1 |

[1] 2 (para methoxy benzene diazo mercapto) naphthalene.

The dispersing agent comprised a 45 per cent aqueous solution of dioxane. Polymerization was effected at 50° C. The product was compounded according to the recipe of Example II. For purposes of comparison, polymers prepared according to the GR–S recipe in aqueous emulsion were compounded and evaluated under similar conditions. Results of the tests are tabulated in Tables V, VI, VII and VIII.

TABLE V

Stress-strain properties at 80° F.

| Min. Cure at 307° F. | Pounds per Square Inch at— | | | | | | Elongation (per cent) |
|---|---|---|---|---|---|---|---|
|  | 100% | 200% | 300% | 400% | 500% | Break |  |
| (DIOXANE PROCESS POLYMERS) | | | | | | | |
| 10 | 190 | 390 | 790 | 1,380 | 2,005 | 3,770 | 688 |
| 20 | 260 | 650 | 1,390 | 2,260 | 3,390 | 4,800 | 595 |
| 30 | 270 | 780 | 1,660 | 2,760 | 4,110 | 4,750 | 540 |
| 45 | 250 | 700 | 1,560 | 2,580 | 3,930 | 4,710 | 550 |
| 75 | 260 | 800 | 1,740 | 2,880 | 4,200 | 4,720 | 540 |

(CONTROL)

| Min. Cure at 307° F. | | | | | | |
|---|---|---|---|---|---|---|
| 10 | 110 | 170 | 260 | 400 | 550 | 1,010 | 795 |
| 20 | 210 | 440 | 910 | 1,450 | 1,995 | 3,200 | 680 |
| 30 | 200 | 560 | 1,190 | 1,800 | 2,580 | 3,390 | 608 |
| 45 | 240 | 650 | 1,330 | 2,010 | 2,820 | 3,620 | 595 |
| 75 | 240 | 660 | 1,345 | 2,045 | 2,870 | 3,720 | 570 |

TABLE VI

*Stress-strain properties at 200° F.*

| Min. Cure at 307° F. | Pounds per Square Inch at— | | | | Elongation (per cent) |
|---|---|---|---|---|---|
| | 100% | 200% | 300% | Break | |

(DIOXANE PROCESS POLYMERS)

| | | | | | |
|---|---|---|---|---|---|
| 20 | 120 | 340 | 680 | 1,780 | 490 |
| 45 | 240 | 660 | 1,180 | 1,610 | 400 |

(CONTROL)

| | | | | | |
|---|---|---|---|---|---|
| 20 | 100 | 240 | 540 | 1,190 | 490 |
| 45 | 80 | 250 | 590 | 800 | 440 |

TABLE VII

*Stress-strain properties oven aged 24 hours at 212° F.*

| Min. Cure at 307° F. | Pounds per Square Inch at— | | | | Elongation (per cent) |
|---|---|---|---|---|---|
| | 100% | 200% | 300% | Break | |

(DIOXANE PROCESS POLYMERS)

| | | | | | |
|---|---|---|---|---|---|
| 10 | 370 | 1,070 | 2,120 | 4,150 | 450 |
| 30 | 400 | 1,250 | 2,460 | 3,760 | 335 |
| 75 | 370 | 1,050 | 2,140 | 3,400 | 390 |

(CONTROL)

| | | | | | |
|---|---|---|---|---|---|
| 10 | 205 | 530 | 1,110 | 3,130 | 635 |
| 30 | 415 | 1,200 | 2,110 | 3,380 | 440 |
| 75 | 300 | | | 700 | 150 |

TABLE VIII

*Hysteresis properties*

| Min. Cure at 307° F. | ΔT °F. | Dynamic Compression | | Permanent Set | Resilience (Per Cent) | Compressed (Per Cent) |
|---|---|---|---|---|---|---|
| | | Initial | Increase | | | |

(DIOXANE PROCESS POLYMERS)

| | | | | | | |
|---|---|---|---|---|---|---|
| 30 | 62.3 | 8.5 | 1.3 | 0.8 | 70.6 | 34.9 |
| 45 | 62.7 | 9.0 | 0.9 | 0.4 | 70.4 | 34.6 |

(CONTROL)

| | | | | | | |
|---|---|---|---|---|---|---|
| 30 | 86.3 | 14.4 | 5.8 | 3.6 | 56.6 | 39.6 |
| 45 | 83.0 | 12.2 | 5.1 | 1.2 | 58.1 | 37.6 |

EXAMPLE V

In order to demonstrate the effectiveness of dioxane-water emulsion systems at lower temperature, a reactor was charged using the following recipe:

| | Parts by weight |
|---|---|
| Butadiene | 70 |
| Styrene | 30 |
| Water | 200 |
| Dioxane | 50 |
| Rosin soap (pH=10.3) | 5 |
| Mixed tertiary mercaptan [1] | 0.4 |
| Diazo thioether [2] | 0.3 |
| Potassium ferricyanide | 0.3 |
| Trisodium phosphate dodecahydrate | 0.5 |

[1] A blend of tertiary $C_{12}$, $C_{14}$, and $C_{16}$ mercaptans in a ratio of 3:1:1 parts by weight.
[2] 2-(para-methoxybenzene diazo mercapto)-naphthalene.

The system was polymerized in the conventional manner, the temperature being maintained at 5° C. Samples were removed at the end of 4, 7.5, and 24 hours for testing to determine degree of conversion. Results of these tests were as follows:

| Time (Hrs.): | Conversion (per cent) |
|---|---|
| 4.0 | 13.4 |
| 7.5 | 29.5 |
| 24.0 | 59.6 |

EXAMPLE VI

A polymerization was carried out to demonstrate the use of a dioxane-water dispersing medium when employing a redox recipe. A reactor was charged using the following:

| | Parts by weight |
|---|---|
| Butadiene | 72 |
| Styrene | 28 |
| Rosin soap (pH=10) | 3.5 |
| Soap flakes | 1.2 |
| Water | 140 |
| Dioxane | 40 |
| Mixed tertiary mercaptans [1] | 0.4 |
| Cumene hydroperoxide [2] | 0.2 |
| Sodium pyrophosphate decahydrate | 1.0 |
| Ferrous sulfate heptahydrate | 0.1 |
| Levulose | 1.0 |

[1] A blend of tertiary $C_{12}$, $C_{14}$, and $C_{16}$ mercaptans in a ratio of 3:1:1 parts by weight.
[2] Also known as $\alpha,\alpha$-dimethylbenzyl hydroperoxide and, more formally, as phenyl(dimethyl)hydroperoxymethane.

The polymerization was carried out at a temperature of 15° C. using the conventional technique. Samples were withdrawn at the end of 4, 8, 24, and 49 hours for testing. Conversions were as follows:

| Time (Hrs.): | Conversion (per cent) |
|---|---|
| 4 | 0.2 |
| 8 | 1.5 |
| 24 | 54.9 |
| 49 | 82.5 |

As will be evident to those skilled in the art, various modifications of this invention can be made, or followed, in the light of the foregoing disclosure and discussion, without departing from the spirit or scope of the disclosure or from the scope of the claims.

We claim:

1. An improved process for producing a synthetic rubber from 1,3-butadiene and styrene and having a high tensile strength and a low hysteresis, which comprises copolymerizing a monomeric material, comprising a major amount of 1,3-butadiene and a minor amount of styrene, at a temperature between —10 and 50° C. and in the presence of a catalyst composition comprising 0.2 part phenyl (dimethyl) hydroperoxymethane, 1.0 part sodium pyrophosphate decahydrate, 0.1 part ferrous sulfate heptahydrate, and 1.0 part levulose, together with 0.4 part tertiary alkyl mercaptan having twelve to sixteen carbon atoms per molecule, said parts being parts by weight per 100 parts of said monomeric material, while emulsified with an aqueous medium comprising water and 45 per cent 1,4-dioxane with a weight ratio of said aqueous medium to said monomeric material between 1.5:1 and 275:1 and in the presence of a rosin soap emulsifying agent, and recovering a resulting synthetic rubber polymer having a high tensile strength and a low hysteresis.

2. In a process for the polymerization of a monomeric material comprising at least a major portion of a 1,3-diolefin while dispersed in an aqueous medium to produce a synthetic rubber having a high tensile strength and a low hysteresis, the improvement which comprises polymerizing said monomeric material at a temperature between −30 and 50° C. in the presence of a catalyst composition comprising catalytic amounts of phenyl (dimethyl) hydroperoxymethane, a water-soluble pyrophosphate, a water-soluble ferrous salt, and a reducing sugar, together with 0.05 to 1.4 parts by weight of alkyl mercaptan having twelve to sixteen carbon atoms per molecule, per one hundred parts by weight of said monomeric material, while emulsified with an aqueous medium comprising water and 45 per cent 1,4-dioxane with a weight ratio of said aqueous medium to said monomeric material between 1.5:1 and 2.75:1 and in the presence of a rosin soap emulsifying agent, and recovering a resulting synthetic rubber polymer having a high tensile strength and a low hysteresis.

3. In a process for the production of synthetic rubber by polymerizing a monomeric material comprising a major amount of 1,3-butadiene and a minor amount of styrene while dispersed in an aqueous medium under polymerization conditions, the improvement which comprises polymerizing said monomeric material while dispersed in an aqueous medium containing 45 per cent by weight of 1,4-dioxane, and recovering a resulting synthetic rubber product having a higher tensile strength and a lower hysteresis than a synthetic rubber produced under otherwise identical conditions in the absence of 1,4-dioxane.

CHARLES F. FRYLING.
JAMES E. TROYAN.
JAMES E. PRITCHARD.

REFERENCES CITED

The following references are of record in the file of this patent:

UNITED STATES PATENTS

| Number | Name | Date |
|---|---|---|
| 1,880,918 | Ebert et al. | Oct. 4, 1932 |
| 2,380,473 | Stewart | July 31, 1945 |
| 2,396,963 | Mortenson | Mar. 19, 1946 |
| 2,402,136 | Hanford et al. | June 18, 1946 |
| 2,470,065 | Barnes | May 10, 1949 |

---

Certificate of Correction

Patent No. 2,604,466

July 22, 1952

CHARLES F. FRYLING ET AL.

It is hereby certified that error appears in the printed specification of the above numbered patent requiring correction as follows:

Column 5, line 37, for "has" read *had*; column 6, line 63, for "modified" read *modifier*; column 8, line 23, Table IV, second column thereof, in the heading, line 1, for "*∆T'*" read *∆T*; column 11, line 10, for "275:1" read *2.75:1*;

and that the said Letters Patent should be read as corrected above, so that the same may conform to the record of the case in the Patent Office.

Signed and sealed this 26th day of May, A. D. 1953.

[SEAL]

THOMAS F. MURPHY,
*Assistant Commissioner of Patents.* part ferrous sulfate heptahydrate, and 1.0 part levulose, together with 0.4 part tertiary alkyl mercaptan having twelve to sixteen carbon atoms per molecule, said parts being parts by weight per 100 parts of said monomeric material, while emulsified with an aqueous medium comprising water and 45 per cent 1,4-dioxane with a weight ratio of said aqueous medium to said monomeric material between 1.5:1 and 275:1 and in the presence of a rosin soap emulsifying agent, and recovering a resulting synthetic rubber polymer having a high tensile strength and a low hysteresis.

2. In a process for the polymerization of a monomeric material comprising at least a major portion of a 1,3-diolefin while dispersed in an aqueous medium to produce a synthetic rubber having a high tensile strength and a low hysteresis, the improvement which comprises polymerizing said monomeric material at a temperature between −30 and 50° C. in the presence of a catalyst composition comprising catalytic amounts of phenyl (dimethyl) hydroperoxymethane, a water-soluble pyrophosphate, a water-soluble ferrous salt, and a reducing sugar, together with 0.05 to 1.4 parts by weight of alkyl mercaptan having twelve to sixteen carbon atoms per molecule, per one hundred parts by weight of said monomeric material, while emulsified with an aqueous medium comprising water and 45 per cent 1,4-dioxane with a weight ratio of said aqueous medium to said monomeric material between 1.5:1 and 2.75:1 and in the presence of a rosin soap emulsifying agent, and recovering a resulting synthetic rubber polymer having a high tensile strength and a low hysteresis.

3. In a process for the production of synthetic rubber by polymerizing a monomeric material comprising a major amount of 1,3-butadiene and a minor amount of styrene while dispersed in an aqueous medium under polymerization conditions, the improvement which comprises polymerizing said monomeric material while dispersed in an aqueous medium containing 45 per cent by weight of 1,4-dioxane, and recovering a resulting synthetic rubber product having a higher tensile strength and a lower hysteresis than a synthetic rubber produced under otherwise identical conditions in the absence of 1,4-dioxane.

CHARLES F. FRYLING.
JAMES E. TROYAN.
JAMES E. PRITCHARD.

REFERENCES CITED

The following references are of record in the file of this patent:

UNITED STATES PATENTS

| Number | Name | Date |
|---|---|---|
| 1,880,918 | Ebert et al. | Oct. 4, 1932 |
| 2,380,473 | Stewart | July 31, 1945 |
| 2,396,963 | Mortenson | Mar. 19, 1946 |
| 2,402,136 | Hanford et al. | June 18, 1946 |
| 2,470,065 | Barnes | May 10, 1949 |

---

Certificate of Correction

Patent No. 2,604,466                          July 22, 1952

CHARLES F. FRYLING ET AL.

It is hereby certified that error appears in the printed specification of the above numbered patent requiring correction as follows:

Column 5, line 37, for "has" read *had*; column 6, line 63, for "modified" read *modifier*; column 8, line 23, Table IV, second column thereof, in the heading, line 1, for "*∆T'*" read *∆T*; column 11, line 10, for "275:1" read *2.75:1*;

and that the said Letters Patent should be read as corrected above, so that the same may conform to the record of the case in the Patent Office.

Signed and sealed this 26th day of May, A. D. 1953.

[SEAL]

THOMAS F. MURPHY,
*Assistant Commissioner of Patents.*

Certificate of Correction

Patent No. 2,604,466                                                July 22, 1952

CHARLES F. FRYLING ET AL.

It is hereby certified that error appears in the printed specification of the above numbered patent requiring correction as follows:

Column 5, line 37, for "has" read *had*; column 6, line 63, for "modified" read *modifier*; column 8, line 23, Table IV, second column thereof, in the heading, line 1, for "*∆T'*" read *∆T*; column 11, line 10, for "275:1" read *2.75:1*;

and that the said Letters Patent should be read as corrected above, so that the same may conform to the record of the case in the Patent Office.

Signed and sealed this 26th day of May, A. D. 1953.

[SEAL]

THOMAS F. MURPHY,
                                                  *Assistant Commissioner of Patents.*